Nov. 17, 1964     C. L. MEINHOLDT     3,157,084
HYDRAULIC SHEAR

Filed Aug. 20, 1962     3 Sheets-Sheet 1

INVENTOR.
CHARLES L. MEINHOLDT
BY
Fishburn and Gold
ATTORNEYS

Nov. 17, 1964   C. L. MEINHOLDT   3,157,084
HYDRAULIC SHEAR

Filed Aug. 20, 1962   3 Sheets-Sheet 2

INVENTOR.
CHARLES L. MEINHOLDT
BY
Fishburn and Gold
ATTORNEYS

INVENTOR.
CHARLES L. MEINHOLDT
BY
Fishburn and Gold
ATTORNEYS

United States Patent Office 3,157,084
Patented Nov. 17, 1964

3,157,084
HYDRAULIC SHEAR
Charles L. Meinholdt, 1928 N. Topeka Ave.,
Topeka, Kans.
Filed Aug. 20, 1962, Ser. No. 217,865
5 Claims. (Cl. 83—625)

This invention relates to improvements in shearing apparatus, and more particularly to hydraulically operated shearing apparatus for cutting sheets, plates and the like.

The principal objects of the present invention are: to provide a shear of simple construction which offers advantages not possessed by more complex shearing devices; to provide a shearing apparatus wherein cut-off can be quickly stopped at any point of the blade stroke and reversed; to provide such an apparatus wherein the direction of progressive blade engagement or cutting travel can be easily reversed for evening wear on the shearing blades; to provide an hydraulic shear wherein hold-down is independent of blade movement; to provide such a device wherein shocking and jarring are substantially eliminated during a shearing operation; to provide such an hydraulic shear wherein the movable shearing blade is easily adjustable for proper cutting cooperation with the stationary blade; to provide such a device wherein cutting travel or blade stroke can be speeded up or slowed down as desired; to provide such an apparatus wherein the movable blade support is specially reinforced along the length thereof to reduce the tendency to buckle during heavy cuts; and to provide such a shearing apparatus which takes advantage of a simple cooperating linkage for controlling the vertical stroke of the movable blade.

Other objects and advantages of this invention will become apparent from the following description taken in connection with the accompanying drawings wherein are set forth by way of illustration and example certain embodiments of this invention.

FIG. 5 is a cross-sectional view on an enlarged scale through the shearing apparatus taken on the line 5—5, FIG. 4, particularly showing the link connection between a cross beam and the movable blade support.

Figure 1:
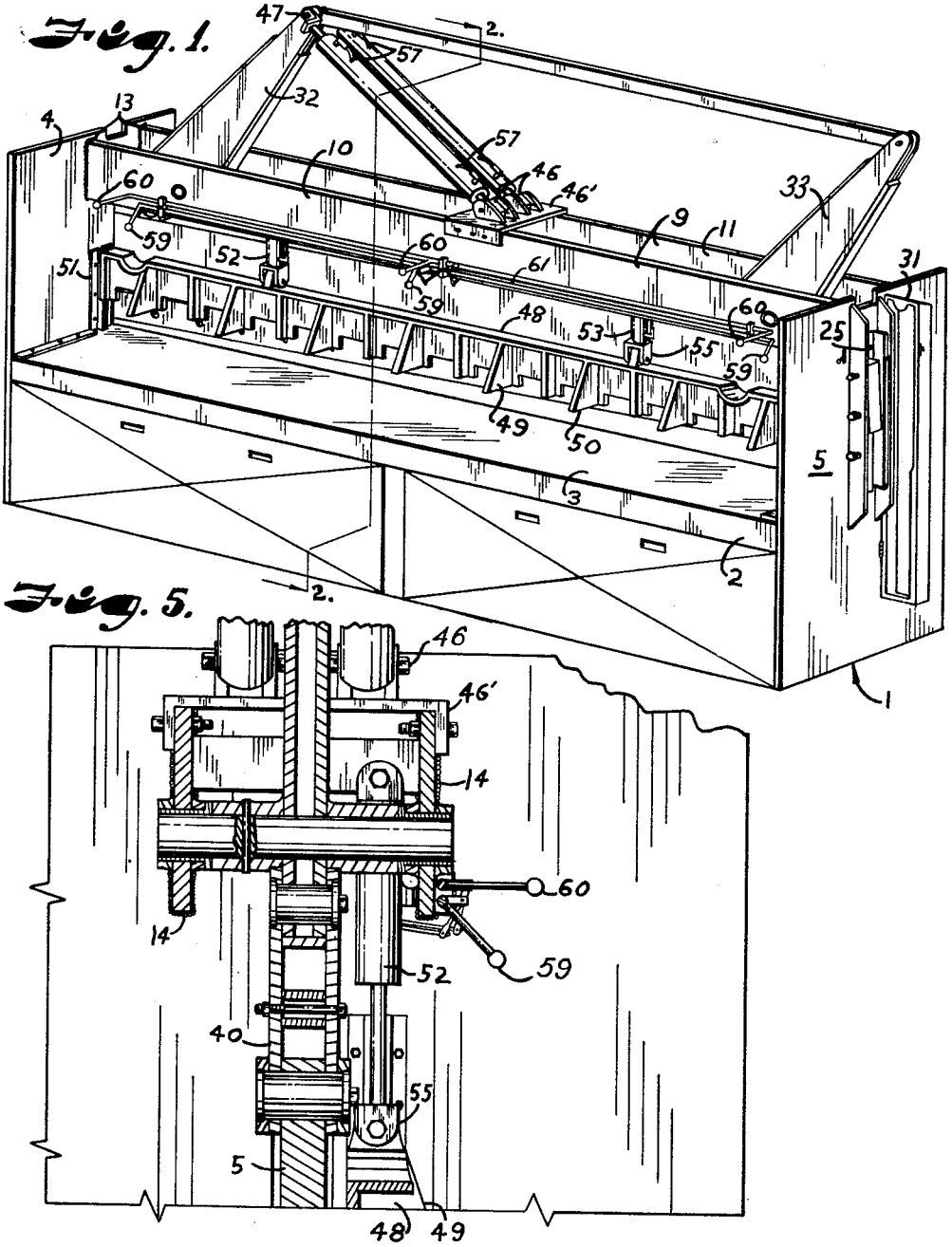
FIG. 1 is a perspective view of hydraulically operated shearing apparatus embodying this invention.

Referring to the drawings in more detail:

The reference numeral 1 generally indicates a shearing apparatus embodying this invention. The apparatus 1 includes an elongated frame bed 2 preferably of welded construction forming a horizontal work platform or surface 3 and having spaced side standards 4 and 5 respectively extending upwardly therefrom. A fixed elongated shearing blade 6 is secured to the frame bed 2 adjacent the rear edge 7 of the platform 3 by means of suitable spaced screws 8 and extends horizontally between the standards 4 and 5. An elongated horizontally extending cross beam 9 is composed of a forward bar 10 and a rear bar 11 mutually parallel and maintained in spaced relation by means of suitable spaced web members 12. The cross beam 9 is secured preferably by welding at opposite ends 13 and 14 thereof to the respective standards 4 and 5 at a position spaced above the platform 3.

Figure 2:
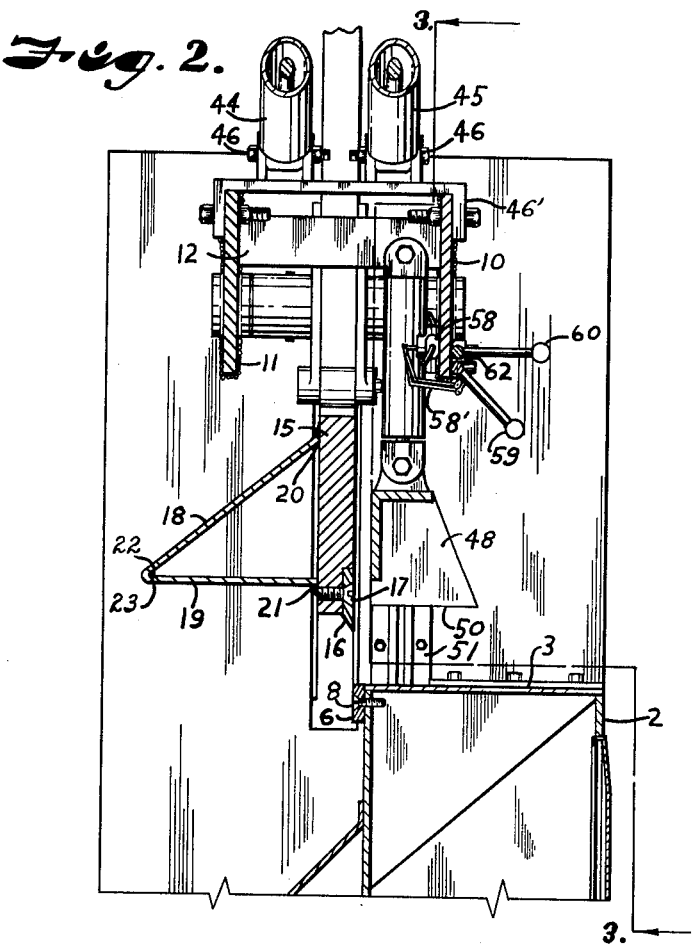
FIG. 2 is a cross-sectional view on an enlarged scale through the shearing apparatus taken on the line 2—2, FIG. 1, particularly showing the reinforcing of the movable blade support.
Figure 6:
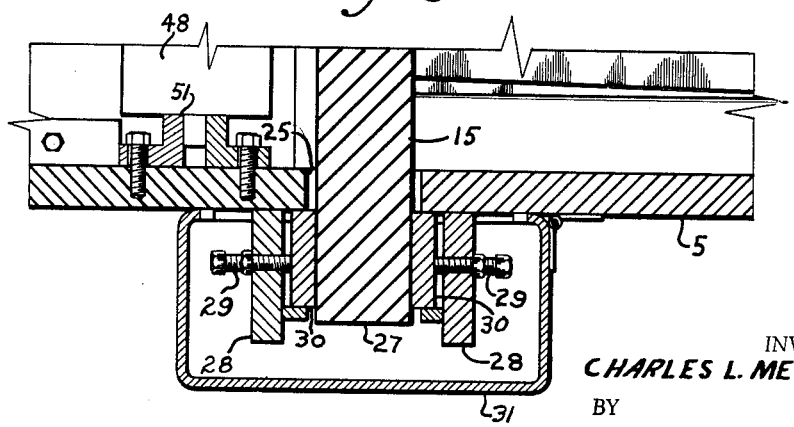
FIG. 6 is a cross-sectional view on an enlarged scale through the shearing apparatus taken on the line 6—6, FIG. 4, showing adjustable gibs for guiding the movable blade support.

An elongated movable blade support 15 extends between the standards 4 and 5 and has a movable shearing blade 16 secured thereto by means of suitable spaced screws or bolts 17. Upper and lower elongated plates 18 and 19 are secured along the front edges 20 and 21 thereof, preferably by welding, to the movable blade support 15 and extend rearwardly thereof, FIG. 2. The elongated plates 18 and 19 are secured together, for example by welding at the rear edges 22 and 23 thereof, and form a rigid triangular reinforcing structure with the movable blade support 15 to resist buckling during high stress.

The side standards 4 and 5 respectively have vertical slots 24 and 25 extending therethrough for receiving the opposite ends 26 and 27 of the movable blade support 15. Gibs or guides 28 are secured in spaced relation; preferably by welding, to the respective side standards 4 and 5 adjacent the slots 24 and 25. The guides 28 have suitable spaced adjusting screws 29 extending therethrough and abutting against guide plates 30. The guide plates 30 slidably contact opposite sides of the respective ends 26 and 27 of the movable blade support 15 for vertically guiding the movable blade in shearing cooperation with the fixed blade 6. Suitable covers 31 are hinged to the respective side standards 4 and 5 to protect the gibs or guides 28 against dirt or accidental contact which may upset the adjustment thereof.

Figure 3:
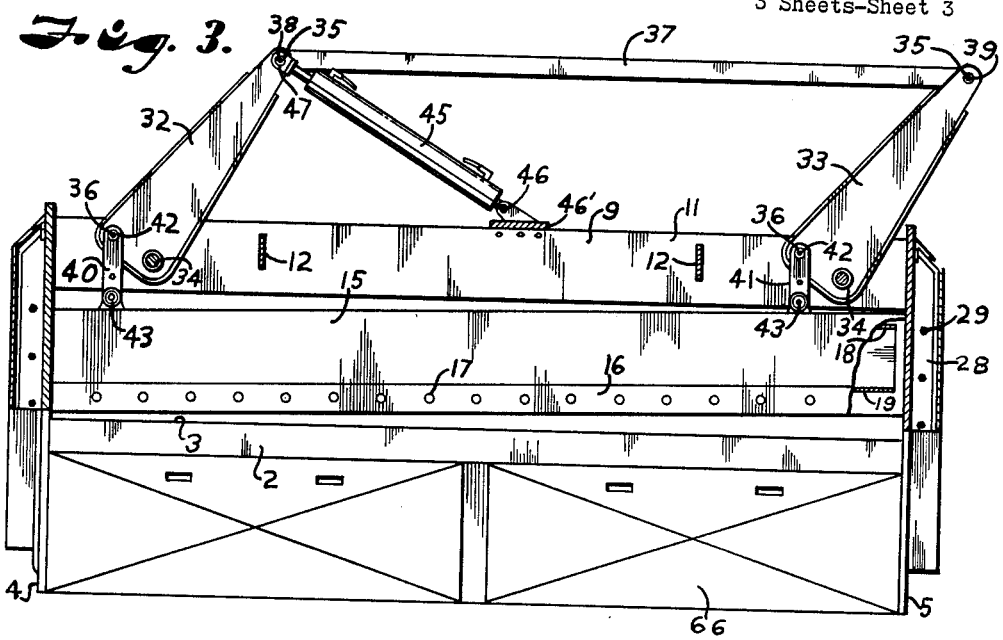
FIG. 3 is a cross-sectional view taken on the line 3—3, FIG. 2, particularly showing a parallel pivoted arm linkage for controlling the vertical stroke of the movable blade.

A pair of generally triangular elongated links or arms 32 and 33 respectively have a first, second and third pivotal connecting point thereon designated 34, 35 and 36. The pivotal connecting points 34, 35 and 36 are in mutually spaced relation and form identical triangular patterns on the respective arms 32 and 33. The arms 32 and 33 are pivotally mounted in laterally spaced and parallel relation at the respective first pivotal connecting points 34 on the cross beam 9, FIG. 3. The arms 32 and 33 are mounted between the forward and rear bars 10 and 11 of the cross beam 9 and are adapted for pivotal motion in a vertical plane parallel to the blades 6 and 16. An elongated horizontally extending strut 37 is pivotally mounted at opposite ends 38 and 39 thereof to the second pivotal connecting points 35 on the respective arms 32 and 33 for maintaining said arms parallel while permitting pivoting on the cross beam 9 as described hereinafter.

A first and a second spaced elongated link respectively designated 40 and 41 are respectively pivotally connected at upper ends 42 thereof to the third pivotal connecting points 36 of the arms 32 and 33. The lower ends 43 of the links 40 and 41 are pivotally connected at spaced positions to the movable blade support 15 for vertically suspending the blade support. The first link 40 is longer in length than the second link 41 which results in a tilting of the movable blade 16 with respect to the fixed blade 6. The links 40 and 41 are removable and freely interchangeable with each other for reversing the tilt of the movable blade 16 to give longer blade life since most of the wear on the blades is normally experienced in the vicinity of the leading engagement of the blades.

Figure 4:
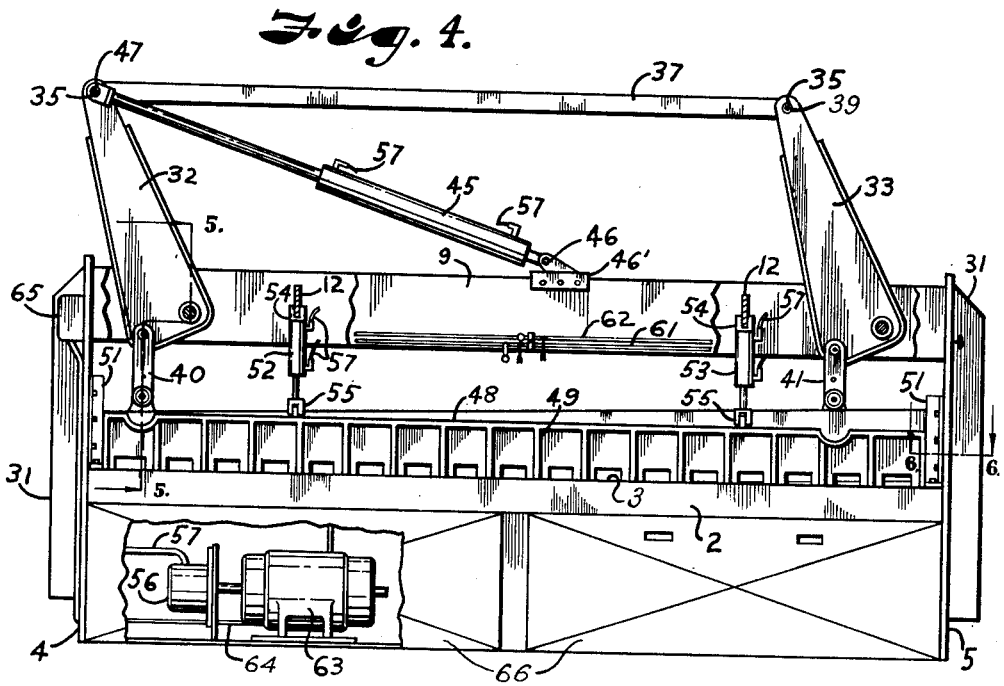
FIG. 4 is a front elevational view of the shearing apparatus with portions broken away to show the hold-down supporting rams and the hydraulic pump and driving motor.

A pair of extensible and retractable hydraulic rams respectively designated 44 and 45 are pivotally mounted at one end 46 thereof to the cross beam 9 by a suitable mounting platform 46'. The other end 47 of the rams 44 and 45 are pivotally connected to the second connecting point 35 of the arm 32. The hydraulic rams 44 and 45 within their range of extension remain at a suitable angle to the arms 32 and 33 for selectively pivoting same upon extension and retraction, FIGS. 3 and 4.

An elongated hold-down member 48 extends horizontally between the side standards 4 and 5 adjacent the respective blades 6 and 16. The hold-down member 48 has suitable ribs 49 extending outwardly therefrom and presenting flat lower clamping surfaces 50 adapted to cooperate with the platform or surface 3 for clamping material therebetween as described hereinafter. Suitable guides 51 are secured to the side standards 4 and 5 and cooperate with opposite ends of the hold-down member 48 for maintaining a path of motion normal to the platform or surface 3. A pair of vertically extending laterally spaced extensible and retractable hydraulic rams 52 and 53 are pivotally secured at the upper ends 54 thereof to the web members 12 of the cross beam 9 and at the lower ends 55 thereof to the hold-down member 48 for selectively suspending and downwardly urging the hold-down member 48 toward the platform or surface 3 of the frame bed 2. An hydraulic pump 56 is mounted beneath the platform or surface 3 and operatively communicates with the hydraulic rams 44, 45, 52 and 53 through suitable tubing 57 in a conventional manner whereby pressure can be applied for either extending or retracting the respective rams. Suitable conventional control valves 58 are responsive to the position of control levers 59 and 60 through linkages 58' for respectively hydraulically extending and retracting at desired variable speeds the hydraulic cylinders 52, 53 and 44, 45. It is noted that the control levers 59 and 60 are respectively multiple in number and communicate with each other through connecting rods 61 and 62 whereby the shearing apparatus operator may control the apparatus from any standing position along the front of the apparatus.

The hydraulic pump 56 is driven, in the illustrated example, by a suitable electric motor 63 powered through conventional electric cables 64 connected to a suitable source of electrical current. A control box 65 mounted on the side standard 4 and connected to the cables 64 permits the actuation of the electric motor 63 when shear operation is desired. Suitable decorative panels 66 assemble with the frame bed 2 to provide a protective enclosure for the hydraulic pump 56 and electric motor 63.

In operation, the positioning of the control levers 59 causes the hold-down member 48 to produce clamping between the hold-down member 48 and the platform or surface 3 for holding a sheet, plate or the like (not shown) for shearing. In response to the particular position of the control levers 60, the arms 32 and 33 are rotated by the extension or retraction of the hydraulic rams 44 and 45 for raising or lowering the movable blade support 15 to provide a shearing action between the blades 6 and 16. Stopping during stroke, reversal of the shearing action and also control over the speed of shearing action is easily obtained by manipulating the levers 60. The gibs or guides 28 are easily adjustable to maintain the most efficient cooperation between the shearing blades 6 and 16 and, as noted above, the interchanging of the links 40 and 41 reverses the tilt or lead of the movable shearing blade 16 to even wear thereof and extend the periods between sharpening.

The above-described shearing apparatus is simple, easy to control, reliable, and permits shearing unexpectedly heavy material without the usual jar or shock normally associated with such operations. It is to be understood that although one form of this invention has been illustrated and described, it is not to be limited to the specific form or arrangement of parts herein described and shown except insofar as such limitations are included in the claims.

What I claim and desire to secure by Letters Patent is:

1. A shearing apparatus comprising:
   (a) a frame bed having laterally spaced standards extending upwardly therefrom,
   (b) a fixed shearing blade secured to said frame bed and extending between said standards,
   (c) an elongated cross beam secured to said standards and spaced above said frame bed,
   (d) a movable blade support extending between said standards and having a movable shearing blade secured thereto,
   (e) vertically extending guides associated with said standards and receiving portions of said movable blade support for guiding said movable blade in shearing cooperation with said fixed blade,
   (f) a pair of arms each having a first, a second and a third pivotal connecting point in mutually spaced relation thereon forming respective connecting point patterns on said arms, said arms being pivotally mounted in spaced relation at said respective first connecting points on said cross beam,
   (g) a rigid non-extensible strut pivotally mounted to said second connecting points for maintaining said arms in controlled pivotal relation to each other during pivoting about said first connecting points on said cross beam,
   (h) means operatively connecting said third connecting points to said movable blade support for vertical suspension of said blade support, and
   (i) a hydraulic ram having one end pivotally mounted on said cross beam and the other end connected to one of said arms in spaced relation to said respective first connecting point for selectively pivoting said arms about said first connecting points for producing shearing between said fixed and movable blade.

2. The apparatus of claim 1 wherein:
   (a) said arms have identical triangular connecting point patterns thereon, and
   (b) said means pivotally connecting said third connecting points to said movable blade support are links of different length between points of connection for tilting said movable blade with respect to said fixed blade.

3. The apparatus of claim 2 wherein:
   (a) said links of different length are selectively interchangeable with each other for altering the tilt of said movable blade with respect to said fixed blade.

4. The apparatus of claim 1 wherein:
   (a) said movable blade support has a pair of elongated plates secured thereto in vertically spaced relation and extending longitudinally thereof, said plates also extending rearwardly of said blade support and being secured together at rear edges thereof at an acute angle and forming a rigid reinforced structure with said blade support.

5. A shearing apparatus comprising:
   (a) an elongated frame bed having laterally spaced side standards extending upwardly therefrom,
   (b) a fixed shearing blade secured to said frame bed and extending horizontally between said standards,
   (c) an elongated horizontally extending cross beam secured at opposite ends thereof to said standards and spaced above said frame bed,
   (d) a movable blade support extending between said standards and having a movable shearing blade secured thereto,
   (e) vertically extending guides associated with said standards and receiving opposite ends of said movable blade support for vertically guiding said movable blade in shearing cooperation with said fixed blade,
   (f) a pair of elongated arms each having a first, a second and a third pivotal connecting point in mutually spaced relation thereon forming respective identical connecting point triangular patterns on said arms, said arms being pivotally mounted in laterally spaced and mutually parallel relation at said respective first connecting points on said cross beam,
   (g) an elongated horizontally extending strut pivotally mounted at opposite ends thereof to said second connecting points for maintaining said arms mutually parallel during pivoting about said first connecting points on said cross beam, (h) a first and a second spaced elongated link respectively pivotally connected at opposite ends thereof to said third connecting points and said movable blade support for vertical suspension of said blade support, said first link being longer than said second link and supporting said movable blade in tilted relation with respect to said fixed blade, said links being interchangeable with each other for reversing the tilt of said movable blade, (i) an extensible and retractable hydraulic ram pivotally mounted at one end thereof to said cross beam and at the other end thereof to one of said second connecting points, said hydraulic ram extending at an angle to said arms for selectively pivoting same upon extension and retraction, (j) an hydraulic pump operatively communicating with said hydraulic ram, means for driving said hydraulic pump, and control means for selectively controlling hydraulic pressure in said hydraulic ram for extending and retracting same.

References Cited by the Examiner

UNITED STATES PATENTS

| | | | |
|---|---|---|---|
| 738,787 | 9/03 | Fogarth | 83—380 |
| 1,569,569 | 1/26 | Pels | 83—636 |
| 1,992,539 | 2/35 | Munschauer | 83—624 |
| 2,371,411 | 3/45 | Rhodes | 83—625 |

FOREIGN PATENTS

| | | |
|---|---|---|
| 1,137,783 | 6/57 | France. |
| 718,911 | 11/54 | Great Britain. |

ANDREW R. JUHASZ, *Primary Examiner.*

HUNTER C. BOURNE, JR., *Examiner.*